United States Patent [19]

Saito et al.

[11] Patent Number: 4,876,657

[45] Date of Patent: Oct. 24, 1989

[54] PRESENTATION DISPLAY APPARATUS FOR DISPLAYING TWO DIFFERENT IMAGES ON SEPARATE DISPLAYS FOR A LISTENER AND A SPEAKER

[75] Inventors: Mitsuo Saito, Yokosuka; Tsukasa Matoba, Kawasaki; Toshio Okamoto, Tokyo, all of Japan

[73] Assignee: Kabushiki Kaisha Toshiba, Kawasaki, Japan

[21] Appl. No.: 81,747

[22] Filed: Aug. 5, 1987

[30] Foreign Application Priority Data

Aug. 15, 1986 [JP] Japan .................................. 61-191254

[51] Int. Cl.$^4$ ........................................... G06F 15/626
[52] U.S. Cl. ..................................... 364/521; 340/718; 340/734
[58] Field of Search ........................ 364/521, 518, 522; 358/102, 185; 340/718, 732, 734, 705, 711, 701, 703; 434/323

[56] References Cited

U.S. PATENT DOCUMENTS

| | | | |
|---|---|---|---|
| 3,936,596 | 2/1976 | Inuiya .................................. | 358/102 |
| 3,971,000 | 7/1976 | Cromwell ......................... | 340/734 X |
| 4,286,263 | 8/1981 | Lindberg ........................... | 340/718 X |
| 4,333,152 | 6/1982 | Best .................................... | 358/102 X |
| 4,712,191 | 12/1987 | Penna ................................. | 364/521 X |
| 4,730,218 | 3/1988 | Goodrich ........................... | 358/102 X |
| 4,758,887 | 7/1988 | Engel et al. ...................... | 358/185 X |

Primary Examiner—A. D. Pellinen
Assistant Examiner—A. Jonathan Wysocki
Attorney, Agent, or Firm—Oblon, Spivak, McClelland, Maier & Neustadt

[57] ABSTRACT

A presentation display apparatus including a data storage section for storing a plurality of explanative image data each having (R), (G) and (B) color image components, a data processing section for adding, to the explanative image data from the data storage section, function select image data different in color component from the explanative image data, an image memory for storing the image data of one screen image output from the data processing section, a listener's first display device for displaying the image data which is delivered from image memory and a speaker's second display device. The image data output from the image memory is supplied through a first color converter to the listener's display device and through a second color converter to the speaker's display device. In the first color converter, the explanative image data is alone directly delivered as conversion image data in spite of function select menu image data, so that only the explanative (R)/(G)/(B) image is displayed on the listener's display device. In the second converter, the (R)/(G)/(B) input data are directly output as conversion image data when the function select image data is "0" and otherwise converted to all "1" when the function select menu image is "1" so that the function select menu and (R)/(G)/(B) explanative image are overlappingly displayed on the second display device.

16 Claims, 4 Drawing Sheets

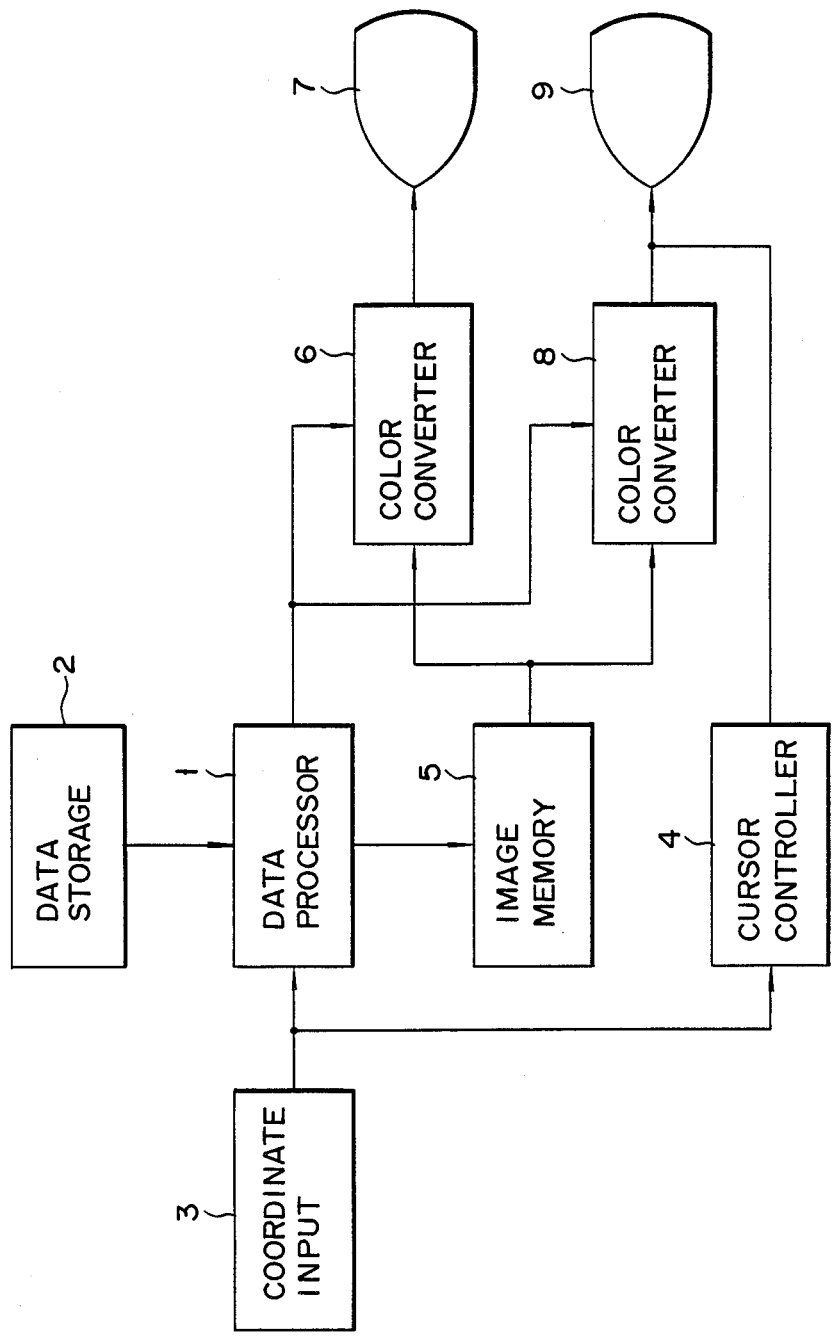
F I G. 2

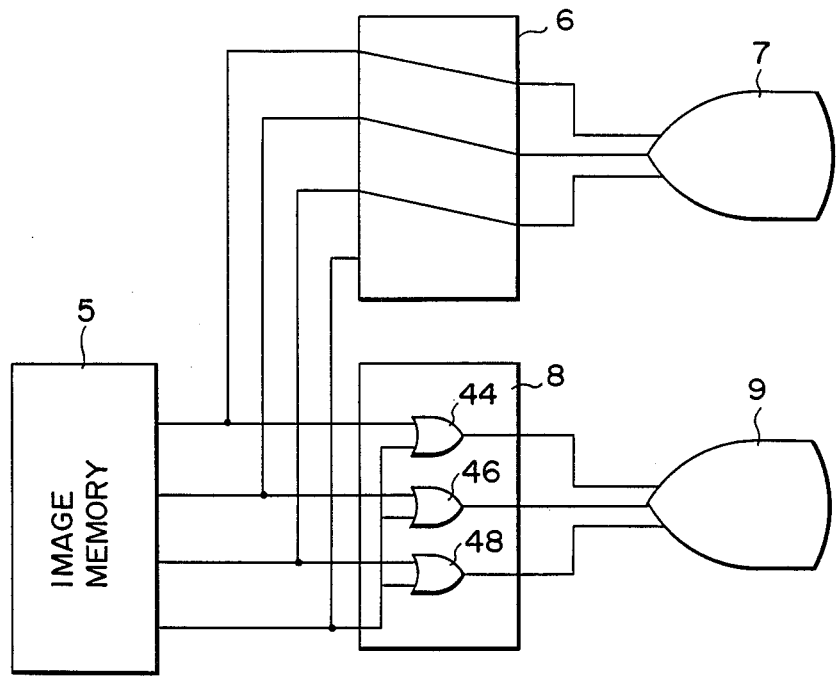
F I G. 5
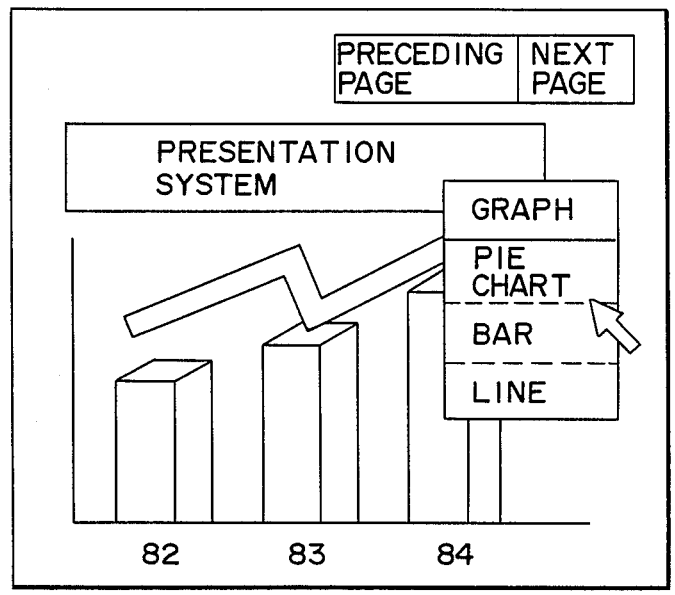
F I G. 6

PRESENTATION DISPLAY APPARATUS FOR DISPLAYING TWO DIFFERENT IMAGES ON SEPARATE DISPLAYS FOR A LISTENER AND A SPEAKER

BACKGROUND OF THE INVENTION

This invention relates to a presentation display apparatus utilizing computers.

In various presentations made in lectures, classroom or other analogous situations, speakers explain their topic or subject matter before the audience, often relying upon the audio-visual aids such as graphs and diagrams, so as to improve the audience's understanding. It is, therefore, possible for the speakers to effectively provide more interesting presentation before the audience, while relying upon such audio-visual aids.

Heretofore, a slide projector, overhead projector and the like have been employed as display devices for assisting the speaker to deliver a speech. These devices are initially prepared by the speaker so that characters and/or images are projected on the screen through these display devices. However, a longer film preparation time, poorer operability in a "frame" feed time during presentation and higher cost, for example, are involved, inflicting a greater burden on the speaker.

In recent years, attempts have been made for the speakers to prepare explanative diagrams and graphs with an aid of computers in place of the aforementioned display devices and to project them onto, for example, a display screen. In this case, screen editors, for example, of a computer are utilized in the preparation of a screen image as distinct from the conventional film image preparation. During presentation, the screen image is explained with the use of a pointing device, such as a mouse, digitizer or joystick, because the cursor can be freely moved to a proper location within the image screen.

In the computer-assisted display device, in order to switch the screen image now explained to the next screen image, a function select menu representing "next page", "preceding page", etc. is displayed on the image screen and, through the movement of the cursor across the image screen, the menu item is indicated on the screen in which case that indication is made by the operation of, for example, a switch of the mouse, etc. on the computer.

However, the display of such function select menu is not necessary to the audience or listeners and, rather, their attention is often distracted from the speaker's topic due to the display of unnecessary menu items, preventing an understanding of the audience.

In order to avoid such a situation, separate screens may be prepared one for the speaker and one for the audience, but a double preparation time is required in this connection. Furthermore, the memory capacity becomes double for such separate screen image data to be stored in memory.

SUMMARY OF THE INVENTION

An object of this invention is to provide a presentation display apparatus which can give a better understanding of a speaker's topic or subject matter to an audience, while ensuring a better operability on the display apparatus.

Another object of this invention is to provide a presentation display apparatus of a simple arrangement which can prepare mutually different listener's image data and speaker's image data from image data of one image screen without the necessity of increasing an image memory capacity.

Still another object of this invention is to provide a presentation display apparatus which can prepare listener's image data and speaker's image data with a function select menu added to the speaker's image data, by applying a mutually different color conversion process to the corresponding screen image data stored in an image memory for each color component.

According to this invention a presentation display apparatus is provided which comprises an image memory for storing an image corresponding to one image screen, converters for applying first and second conversion processes to the image read out of the image memory to obtain first and second images, and first and second display devices for displaying the first and second images.

BRIEF DESCRIPTION OF THE DRAWINGS

FIG. 2 is a circuit arrangement of the embodiment of this invention of FIG. 1;

FIG. 5 is a block diagram showing a major section of a second embodiment of this invention; and FIG. 6 shows another form of a function select menu displayed on the speaker's image screen only.

DETAILED DESCRIPTION OF THE PREFERRED EMBODIMENT

Figure 1:
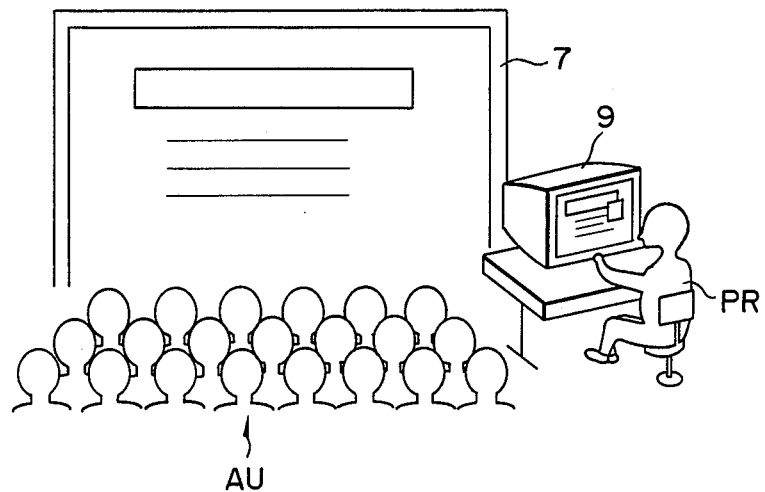
FIG. 1 is a presentation display apparatus according to an embodiment of this invention.

FIG. 1 shows one example of presentation using the presentation display apparatus according to a first embodiment of this invention.

Projection type screen 7 is placed in front of an audience (listeners) AU and CRT monitor 9 for speaker's use is placed in back of the audience AU. A keyboard, mouse etc. are connected to CRT monitor 9 to, for example, move a cursor for indication or to switch a screen image. The speaker initially prepares explanative image data, such as an abstract of explanation or associated data (diagrams, graphs) so that the speaker can switch the data at a proper timing for presentation on a computer-assisted display apparatus. Here the aforementioned explanative image data items are both displayed on screen 7 for the audience and on monitor 9 for the speaker. In addition to this, a function select menu for display contents variation (a partial enlargement or a variation of graph formats) and switching of the screen image are also displayed only on the screen of speaker's CRT monitor 9. The speaker can move the cursor across the menu screen and input a proper function select menu item to the computer by operating the switch of the mouse in which case the image screen can be properly switched in accordance with the progress of explanation. For this reason, the menu items essentially unnecessary to the audience are not displayed on screen 7, while never reducing any display area for effective data, so that the audience's attention is not distracted by the display of the unnecessary data.

FIG. 2 is a block diagram showing one embodiment of this invention. Data processor 1 is comprised of, for example, a CPU, I/O controller, main memory and so on and adapted to receive explanative image data from data storage 2 and coordinate data from coordinate input section 3 and to control various associated parts of the apparatus. Data processor 1 generates function select menu image data to be added to an explanative image.

Data storage 2 serves as a data storing means for storing the explanative image data and may be comprised of, for example, a magnetic disc unit, floppy disc unit or optical disc unit. The explanative image data is initially prepared by the speakers and stored in data storage section 2 in which case it may be prepared by an ordinary graphics processing or may be input from, for example, an image reader.

Coordinate input section 3 moves a cursor for speaker's function selection across the display screen and delivers the coordinate of a desired menu display area to data processor 1 and cursor controller 4 through the operation of the speaker's switch. In this connection a pointing device, such as a mouse, digitizer, joy stick or keyboard, is employed.

Image memory 5 stores, as one image unit, the explanative image data from data storage 2 and function select menu's image data to be added to the aforementioned explanative image data. Image memory 5 stores image data for respective color components—four color components: red (R), green (G), blue (B) and white (W) in this embodiment.

Cursor controller 4 displays, on the screen position designated by coordinate input section 3, a function select cursor pattern which is necessary to the speaker or presenter.

The image data which is output from image memory 5 is supplied through first color converter 6 to first display device 7 for the audience and through second color converter 8 to second display device 9 for the speaker, noting that these display devices 7 and 9 are color display devices responsive to (R), (G) and (B) inputs and that color converters 6 and 8 convert four-bit image signals, i.e., (R)/(G)/(B)/(W) signals to three-bit image signals, i.e., (R)/(G)/(B) image signals. As display devices 7 and 9 use may be made of, for example, a CRT display device or a projection type display device. In particular, a large-sized projection type display device and small-sized CRT display device are preferred as audience's display device 7 and speaker's display device 9, respectively.

Figure 3:
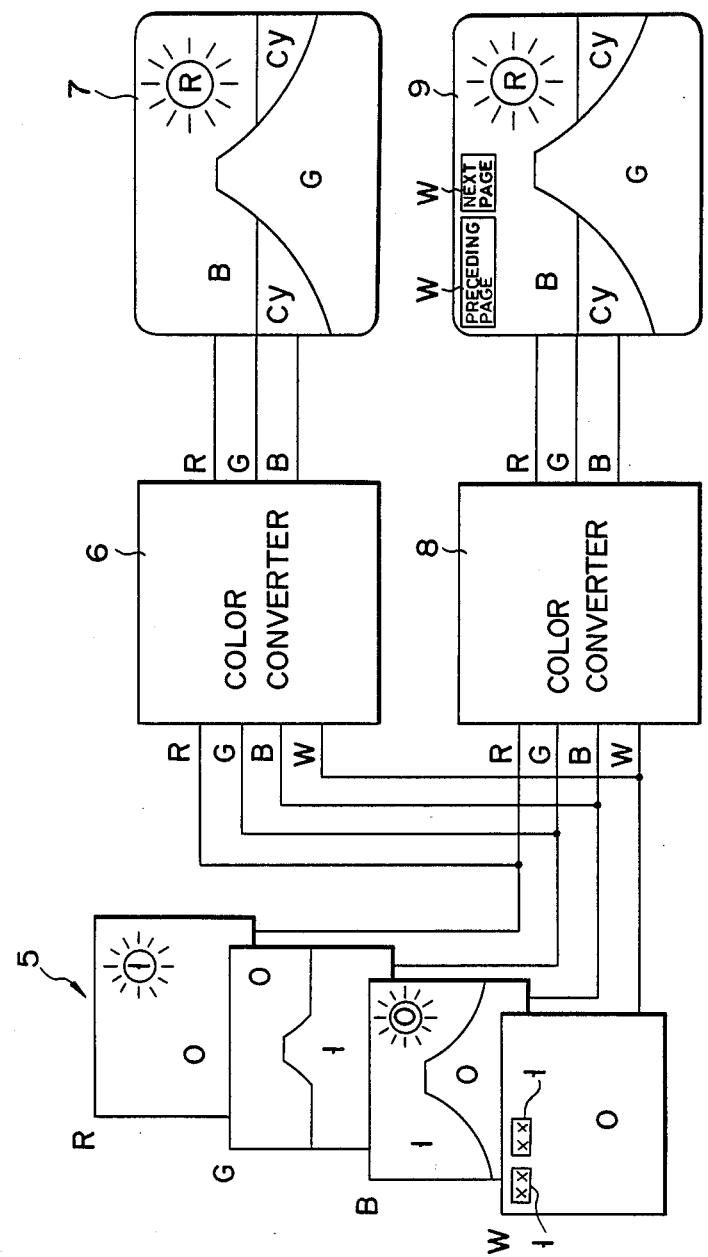
FIG. 3 is a block diagram showing an image memory and converters, as well as one form of a function select menu in more detail which are included in the embodiment of FIG. 1.

FIG. 3 is a block diagram showing the portions of image memory 5, color converters 6 and 8 and display devices 7 and 9. Image memory 5 stores four-plane color component image data, i.e., (R)/(G)/(B)/(W) color component image data. Respective color component image data are of a binary data and are input as a four-bit image data per one pixel to color converters 6 and 8. Here, the explanative image screen and function select menu image screen are represented by the (R)/(G)/(B) color component image data and (W) color component image data, respectively. Color converters 6 and 8 convert the four-bit (16 levels) image data to three-bit data, i.e., (R)/(G)/(B) bit data for color conversion and deliver them to display devices 7 and 9, respectively.

These two color converters 6 and 8 perform a different color conversion processing. That is, in first converter 6, even if the (W) color component data is "0" or "1", (R)/(G)/(B) input data is output as intact conversion image data as shown in Table 1. Therefore, a synthesized image (explanative image) comprised of the (R)/(G)/(B) color component image only is displayed on first display device 7 as shown in FIG. 3, but the (W) image data representing the function select menu item is never shown on display device 7.

In second color converter 8, as shown in Table 2, on the other hand, if (W)="0", the (R)/(G)/(B) input image data are output as intact color conversion image data as in the case of first color converter 6. At (W)="1", the (R)/(G)/(B) image data are all converted to "1", that is, the corresponding pixel becomes a white pixel, irrespective of the level of the input image data. As shown in FIG. 3, the function select menu item, in addition to the explanative image, is displayed on second display device 9.

TABLE 1

| No. | Input | | | | Output | | | |
|---|---|---|---|---|---|---|---|---|
| | W | B | G | R | B | G | R | Color |
| 0 | 0 | 0 | 0 | 0 | 0 | 0 | 0 | black |
| 1 | 0 | 0 | 0 | 1 | 0 | 0 | 1 | red |
| 2 | 0 | 0 | 1 | 0 | 0 | 1 | 0 | green |
| 3 | 0 | 0 | 1 | 1 | 0 | 1 | 1 | yellow |
| 4 | 0 | 1 | 0 | 0 | 1 | 0 | 0 | blue |
| 5 | 0 | 1 | 0 | 1 | 1 | 0 | 1 | purple |
| 6 | 0 | 1 | 1 | 0 | 1 | 1 | 0 | cyan |
| 7 | 0 | 1 | 1 | 1 | 1 | 1 | 1 | white |
| 8 | 1 | 0 | 0 | 0 | 0 | 0 | 0 | black |
| 9 | 1 | 0 | 0 | 1 | 0 | 0 | 1 | red |
| 10 | 1 | 0 | 1 | 0 | 0 | 1 | 0 | green |
| 11 | 1 | 0 | 1 | 1 | 0 | 1 | 1 | yellow |
| 12 | 1 | 1 | 0 | 0 | 1 | 0 | 0 | blue |
| 13 | 1 | 1 | 0 | 1 | 1 | 0 | 1 | purple |
| 14 | 1 | 1 | 1 | 0 | 1 | 1 | 0 | cyan |
| 15 | 1 | 1 | 1 | 1 | 1 | 1 | 1 | white |

TABLE 2

| No. | Input | | | | Output | | | |
|---|---|---|---|---|---|---|---|---|
| | W | B | G | R | B | G | R | Color |
| 0 | 0 | 0 | 0 | 0 | 0 | 0 | 0 | black |
| 1 | 0 | 0 | 0 | 1 | 0 | 0 | 1 | red |
| 2 | 0 | 0 | 1 | 0 | 0 | 1 | 0 | green |
| 3 | 0 | 0 | 1 | 1 | 0 | 1 | 1 | yellow |
| 4 | 0 | 1 | 0 | 0 | 1 | 0 | 0 | blue |
| 5 | 0 | 1 | 0 | 1 | 1 | 0 | 1 | purple |
| 6 | 0 | 1 | 1 | 0 | 1 | 1 | 0 | cyan |
| 7 | 0 | 1 | 1 | 1 | 1 | 1 | 1 | white |
| 8 | 1 | 0 | 0 | 0 | 1 | 1 | 1 | white |
| 9 | 1 | 0 | 0 | 1 | 1 | 1 | 1 | white |
| 10 | 1 | 0 | 1 | 0 | 1 | 1 | 1 | white |
| 11 | 1 | 0 | 1 | 1 | 1 | 1 | 1 | white |
| 12 | 1 | 1 | 0 | 0 | 1 | 1 | 1 | white |
| 13 | 1 | 1 | 0 | 1 | 1 | 1 | 1 | white |
| 14 | 1 | 1 | 1 | 0 | 1 | 1 | 1 | white |
| 15 | 1 | 1 | 1 | 1 | 1 | 1 | 1 | white |

Color converters 6 and 8 are comprised of memories in which the outputs as shown in respective columns to Tables 1 and 2 are stored in the address locations with the input data as the address. It is preferred that the memory be of such a rewritable type as to allow their contents to be rewritten, as required, under control of data processor 1. According to this invention, various forms of display can be made with a high degree of freedom by use of this rewrite of memory. The (R) color component image representing a "sun" in FIG. 3 may be erased with the output (R) made to be "0" and instead "B" made to be "1" at the input (R)="1". The situation under which the number of bits in the input image is increased can readily be coped with through the replacement of memory contents.

When the explanative image stored in data storing section 2 is transferred to data processor 1, the function select menu of the (W) color component as distinct from the other color components is added by data processor 1 to the explanative image and delivered as such to image memory 5. In this way, the respective different images are displayed on the audience's display device 7 and speaker's display device 9.

Figures 4A, 4B:
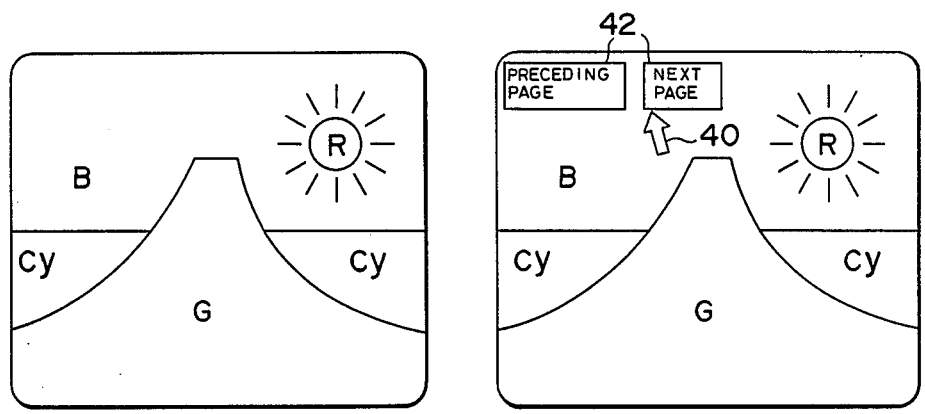
FIGS. 4A and 4B show a listener's screen image and speaker's screen image on the embodiment of FIG. 1.

A cursor pattern generated from cursor controller is superimposed on speaker's display device 9 only in which case the cursor pattern is white in color. As a result, the audience screen and speaker's screen are displayed as shown in FIGS. 4A and 4B, respectively. That is, the audience's screen image is created as the explanative image only as shown in FIG. 4A, while on the other hand (W) color cursor 40 and function select menu items 42 are added, unlike the audience's screen image, on the speaker's screen image as shown in FIG. 4B.

Cursor 40 can be moved at will with the use of coordinate input section 3 and the coordinate of a position on the image screen as indicated by cursor 40 now in display are entered into data processor 1 through the depression of a switch (for example, mouse's switch) attached to coordinate input section 3, so that one function item can be selected. If the speaker moves cursor 40 across the image screen to, for example, the marker item "next page" of function select menu 42 and depresses the switch of coordinate input section 3, data processor 1 executes "the next page display instruction" and reads the next page's explanative data from data storage 2 for delivery to image memory 5. If, on the other hand, the speaker moves the marker item "preceding page" of function select menu 42 and depresses the switch of coordinate input section 3, data processor 1 executes "the preceding page display instruction" and reads the preceding page's explanative data for supply to image memory 5.

Moving cursor 40 in accordance with the respective explanatory contents, the speakers explain and, at the completion of the explanation about an image corresponding to one page, display another image corresponding to the next page while moving cursor 40 so that they may continue their speech.

According to this embodiment, since cursor 40 for function selection and function select menu 42 are displayed on speaker's display device 9 alone, not on the audience's display device 7, the audiences are not disturbed by unnecessary extra display in their attention to the topic now in progress to enable the speaker to offer effective presentation before them. In comparison with the case where an image memory is connected to the respective image screen, image memory capacity is reduced because of using only one image memory in controlling a plurality of display image screens.

This invention is not restricted to the aforementioned embodiment. Although the four image plane data items have been explained as being input to color converters 6 and 8, more image data planes can be employed to increase the number of image screen data items for combination. It is also possible to selectively change the portion of the display image, without rewriting the contents of the image memories, by changing the conversion process of color converters 6 and 8.

Although, in the aforementioned embodiment, the cursor has been explained as being superimposed on the image screen of the speaker's display device, it may be displayed through the image memory as in the case of the display of the function select menu. That is, it is only necessary that the (W) color image with the function select menu and cursor be stored in image memory and then displayed on the speaker's display device only.

As color converters 6 and 8 use may be made of not only electrically erasable memories but also, if it is unnecessary to change the conversion process, logic gates to obtain the same result. That is, the (R), (G) and (B) image data, except for the (W) image data, are connected to first color converter 6 so that the (R), (G) and (B) inputs are supplied, as they are, to first display device 7. In second color converter 8, the (R), (G) and (B) image data are coupled to first input terminals of OR gates 44, 46 and 48 and the (W) image data is coupled to the second input terminals of OR gates 44, 46 and 48. The outputs of OR gates 44, 46 and 48 are supplied as (R), (G) and (B) signals to second display device 9.

As the function select menu items, use may be made of menu items of the data representation format, such as a graph to be changed to a pie chart, bar graph or line graph, as shown in FIG. 6 as well as "preceding page" and "next page". That is, the bar graph and line graph as shown in FIG. 6 can be switched to a pie chart with the cursor put in alignment with the function select menu corresponding to that pie chart.

As set out above, according to this invention, a mutually different color conversion process is performed on each image data, corresponding to one image screen, which is stored in the image memory for each color component.

By so doing, the listener's image data and speaker's image data with the function select menu added to the listener's image data can be generated in a simple configuration without the necessity for increasing the number of image memories required. It is, therefore, possible to provide a presentation display apparatus which can prepare the listener's image data and speaker's image data, in a mutually different fashion, from image data of one screen image, while assuring a listener's better operability, to enable the audience to gain a deeper understanding of the speaker's topic.

What is claimed is:

1. A presentation display apparatus comprising:
   image memory means for storing image data of one screen image, the image data having color image data of color components;
   image synthesizing means connected to said image memory means, for synthesizing the color image data of color components read out from said image memory means by first and second syntheszing processes which differ from each other thereby to form first and second image data, the first synthesizing process causing all the color image data of color components stored in said memory means to be synthesized and the second synthesizing process causing part of the color image data of color components stored therein to be synthesized;
   first display means for displaying the first image data; and
   second display means for displaying the second image data.

2. A presentation display apparatus according to claim 1, in which said image synthesizing means comprises color converting means for selectively enabling and disabling a display of each color component of said color image data.

3. A presentation display apparatus according to claim 2, in which said image synthesizing means comprises memory means for storing said first and second image data at an address designated by the color image data and for enabling said first and second image data to be rewritten.

4. A presentation display apparatus according to claim 1, in which said image memory means comprises memory means for storing respective image data of said one screen image for every n color components (where n is any positive integer not less than two); said image synthesizing means comprises first color conversion means responsive to said image data of n color components for eliminating the image data of a single specific color component and for delivering the other image data of (n−1) color components as first image data and second color conversion means responsive to said image data of n color components, when the image data of said single specific color component is first level, for eliminating said image data of said single specific color component and for delivering the other image data of (n−1) color components and, when the image data of said single specific color component is second level, for converting all bits of the other image data of (n−1) color components to significant bits and for delivering a converted image data of (n−1) color components as second image data: and said display means comprises color display means responsive to said image data of (n−1) color components to display said first and second image data in respective color display screens.

5. A presentation display apparatus comprising:
   image memory means for storing color image data of one screen image including listener's image data of a plurality of color components and speaker's image data of a single color;
   first signal generating means for synthesizing said plurality of color components read out from said image memory means as first image data;
   second signal generating means for synthesizing said single color component image and said plurality of color component images read out from said image memory means as second image data; and
   display means for displaying said first and second image data.

6. A presentation display apparatus according to claim 5, in which said first signal generating means comprises first signal synthesizing means for delivering said listener's data intact as the first image data and second signal synthesizing means for receiving the color image data read out from said image memory means and for delivering said listener's image intact as the second image data when the speaker's image data is first level and delivering logical sum data of said listener's image data and said speaker's image data as the second image data when the speaker's image data is second level; and said display means comprises color display means responsive to input data of color components representing said listener's image for displaying the first and second image data in respective screens.

7. A presentation display apparatus according to claim 5, in which said first and second signal generating means each comprises a rewritable memory for storing synthesized signal data at an address designated by the color image data.

8. A presentation display apparatus according to claim 5, in which said single specific color component is a color component obtained by additively combining said plurality of color components.

9. A presentation display apparatus according to claim 5, in which said display means comprises projection color monitor means for displaying said first image data and a CRT color monitor for displaying said second image data.

10. A presentation display apparatus according to claim 5, further comprising image storage means for storing a plurality of listener's images, each comprised of a plurality of color components and means for writing listener's image selected from said image storage means into said image memory means.

11. A presentation display apparatus according to claim 10, in which said speaker's image is comprised of a menu image containing an instruction for switching a displayed image to a preceding page or to a next page; and said writing means comprises means for displaying a cursor on said menu image in an overlapped fashion, means for changing a cursor display position freely controlled by an operation of an operation member, and means for switching said displayed image to said preceding page or to the next page in accordance with the display position of said cursor.

12. A presentation display apparatus according to claim 5, in which said single color component of said speaker's image data is a color component different than said plurality of color components of said listener's image data.

13. A presentation display apparatus according to claim 5, in which said second signal generating means converts the color of a pixel of each of said color image data of color components according to the pixel data of said speaker's image data of a single color component image.

14. A presentation display apparatus comprising:
   first memory means for storing a presentation image to be displayed for a listener and a speaker;
   second memory means for storing an auxiliary image for presentation to be displayed only for the speaker;
   image synthesizing means for synthesizing the presentation image and the auxiliary image;
   first display means for displaying the presentation image; and
   second display means for displaying a synthesized image based on the synthesized presentation and auxiliary images.

15. A presentation display apparatus according to claim 14, in which said presentation image is comprised of color components of R, G and B and said auxiliary image is comprised of white color components, and said image synthesizing means adds the white color components to each of the color components of R, G and B.

16. A presentation display apparatus according to claim 15, in which said second display means includes display means for displaying a cursor or a pointer.

* * * * *